United States Patent
Kita

(10) Patent No.: US 10,875,642 B2
(45) Date of Patent: Dec. 29, 2020

(54) VERTICAL TAKEOFF AND LANDING AIRCRAFT

(71) Applicant: HONDA MOTOR CO., LTD., Tokyo (JP)

(72) Inventor: Akinori Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 372 days.

(21) Appl. No.: 16/108,704

(22) Filed: Aug. 22, 2018

(65) Prior Publication Data

US 2019/0061932 A1 Feb. 28, 2019

(30) Foreign Application Priority Data

Aug. 28, 2017 (JP) .................................. 2017-163437

(51) Int. Cl.
*B64C 29/00* (2006.01)
*B64D 27/02* (2006.01)

(52) U.S. Cl.
CPC .......... *B64C 29/0025* (2013.01); *B64D 27/02* (2013.01); *B64C 2201/042* (2013.01); *B64C 2201/048* (2013.01); *B64C 2201/066* (2013.01); *B64D 2027/026* (2013.01)

(58) Field of Classification Search
CPC ............ B64C 29/0008; B64C 29/0016; B64C 29/0025; B64C 29/0083; B64C 2201/048; B64D 2027/026
See application file for complete search history.

(56) References Cited

U.S. PATENT DOCUMENTS

| 2004/0245374 A1* | 12/2004 | Morgan .................... B64C 5/02 244/12.3 |
| 2009/0145998 A1* | 6/2009 | Salyer .................... B64D 27/10 244/17.23 |
| 2010/0219779 A1* | 9/2010 | Bradbrook ................ F02C 7/32 318/153 |
| 2013/0111923 A1 | 5/2013 | Donnelly et al. |
| 2018/0141652 A1* | 5/2018 | Deslypper ............... B64C 39/12 |

FOREIGN PATENT DOCUMENTS

JP 2015-137092 7/2015

* cited by examiner

*Primary Examiner* — Richard G Davis
(74) *Attorney, Agent, or Firm* — Rankin, Hill & Clark LLP

(57) ABSTRACT

There is provided a vertical takeoff and landing aircraft (VTOL), having a main propulsion unit (GT engine) with high-pressure and low-pressure turbine shafts installed along a longitudinal axis of a frame to be rotated by pressurized gas jetted on combustion of an air-fuel mixture to produce propulsion force in a longitudinal direction of the frame, high-pressure side and low-pressure side motor generators coaxially attached to the high-pressure and low-pressure turbine shaft, four fans installed on the frame to be rotatable around axes parallel to a vertical axis of the frame, four propulsion units individually connected to the fans to rotate them and generate lift force in a vertical direction of the frame, and a controller. The controller control operation of the main propulsion unit, motor generators and sub propulsion units to obtain propulsion forces in the longitudinal direction and in the vertical direction of the frame.

6 Claims, 5 Drawing Sheets

FIG. 5

| FRAME OPERATION SEQUENCE | ENGINE OPERATION MODE | LOW PRESSURE SIDE MOTOR-GENERATOR | HIGH PRESSURE SIDE MOTOR-GENERATOR | FAN SIDE MOTOR-GENERATOR |
|---|---|---|---|---|
| STOP | STOP | STOP | STOP | STOP |
| GROUND/IDLING | CHARGING MODE | GENERATOR OPERATION | MOTOR ASSIST | STOP |
| TAKEOFF/ASCENDING | CHARGING MODE | GENERATOR OPERATION | — — — | LARGE OUTPUT |
| HOVERING | CHARGING MODE | GENERATOR OPERATION | — — — | MEDIUM OUTPUT |
| HORIZONTAL FLIGHT | PROPULSION MODE | MOTOR ASSIST | GENERATOR OPERATION | STOP |
| HOVERING | CHARGING MODE | GENERATOR OPERATION | — — — | MEDIUM OUTPUT |
| DESCENDING/LANDING | CHARGING MODE | GENERATOR OPERATION | — — — | SMALL OUTPUT |
| GROUND/IDLING | CHARGING MODE | GENERATOR OPERATION | MOTOR ASSIST | STOP |
| STOP | STOP | STOP | STOP | STOP |

VERTICAL TAKEOFF AND LANDING AIRCRAFT

CROSS-REFERENCE TO RELATED APPLICATION

This application is based upon and claims the benefit of priority from Japanese Patent Application No. 2017-163437 filed on Aug. 28, 2017, the contents of which are incorporated herein by reference.

BACKGROUND OF THE INVENTION

Field of the Invention

This invention relates to a vertical takeoff and landing aircraft (VTOL), more particularly to a hybrid vertical takeoff and landing aircraft with different types of power sources, namely, a gas-turbine engine and motor-generators.

Description of Related Art

Technology related to a hybrid vertical takeoff and landing aircraft can be found in Patent Document 1 (Japanese Unexamined Patent Publication No. JP2015-137092).

The hybrid vertical takeoff and landing aircraft according to the technology of Patent Document 1 is equipped with an engine and motor-generators driven by the engine. The engine drives a single main rotor, the motor-generators drive four sub-rotors, and a configuration is adopted wherein power output of the generators is once stored in a battery before being supplied to motors. The technology of Patent Document 1 is configured as stated above for the purpose of increasing cruising range.

Operation of a vertical takeoff and landing aircraft varies depending on type of flight among different modes such as takeoff mode, landing mode, forward-rearward (horizontal) propulsion mode and the like. In the takeoff and landing operating modes, for example, fuel efficiency considerations make it advisable to minimize forward-rearward (horizontal) propulsion, i.e. to restrict propulsion solely to the takeoff and landing directions. However, the technology disclosed in Patent Document 1 is altogether silent regarding this point.

SUMMARY OF THE INVENTION

An object of this invention is therefore to resolve this shortcoming by providing a hybrid vertical takeoff and landing aircraft enhanced in fuel efficiency performance.

In order to achieve the object, this invention provides a vertical takeoff and landing aircraft, comprising: a main propulsion unit having a high-pressure turbine shaft and a low-pressure turbine shaft installed along a longitudinal axis of a frame and rotated by pressurized gas jetted upon combustion of an air-fuel mixture, the main propulsion unit being driven by obtained jetted stream of high-heat exhaust gas to produce propulsion force in a longitudinal direction of the frame; a high-pressure side motor-generator and a low-pressure side motor generator coaxially attached to the high-pressure turbine shaft and the low-pressure turbine shaft in the frame; multiple fans installed on the frame to be rotatable around axes parallel to a vertical axis of the frame; sub propulsion units individually connected to the multiple fans to rotate the multiple fans and generate lift force in a vertical direction of the frame; and a controller configured to control operation of the main propulsion unit, the high-pressure side motor-generator, the low-pressure side motor generator and the sub propulsion units; wherein the controller controls to; when obtaining propulsion force in the longitudinal direction of the frame, supply electric power obtained by driving the high-pressure side motor-generator by rotation of the high-pressure turbine shaft to the low-pressure side motor generator to operate the low-pressure side motor generator as a motor so as to assist rotation of the low-pressure turbine shaft of the main propulsion unit; and when obtaining propulsion force in the vertical direction of the frame, reduce rotations of the high-pressure turbine shaft and low-pressure turbine shaft of the main propulsion unit to predetermined amounts and operate the sub propulsion units to generate lift force in the vertical direction of the frame, and supply electric power obtained by driving at least one of the high-pressure side motor-generator and the low-pressure side motor generator to the sub propulsion units to increase the lift force in the vertical direction of the frame.

BRIEF DESCRIPTION OF THE DRAWINGS

FIG. 5 is an explanatory diagram showing operation of the vertical takeoff and landing aircraft of FIG. 1.

DETAILED DESCRIPTION OF THE INVENTION

An embodiment for implementing the vertical takeoff and landing aircraft according to this invention is explained with reference to the attached drawings in the following.

Figure 1:
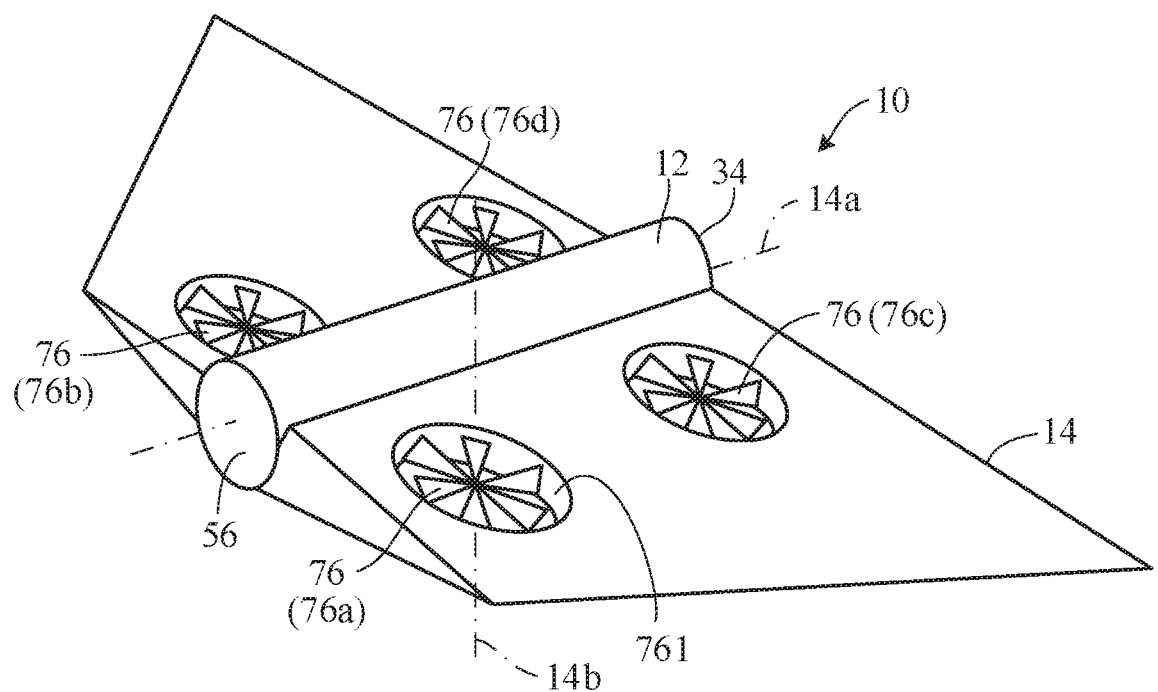
FIG. 1 is a schematic diagram showing an overview of a vertical takeoff and landing aircraft in accordance with an embodiment of this invention which comprises a gas-turbine engine and motor-generators.
Figure 2:
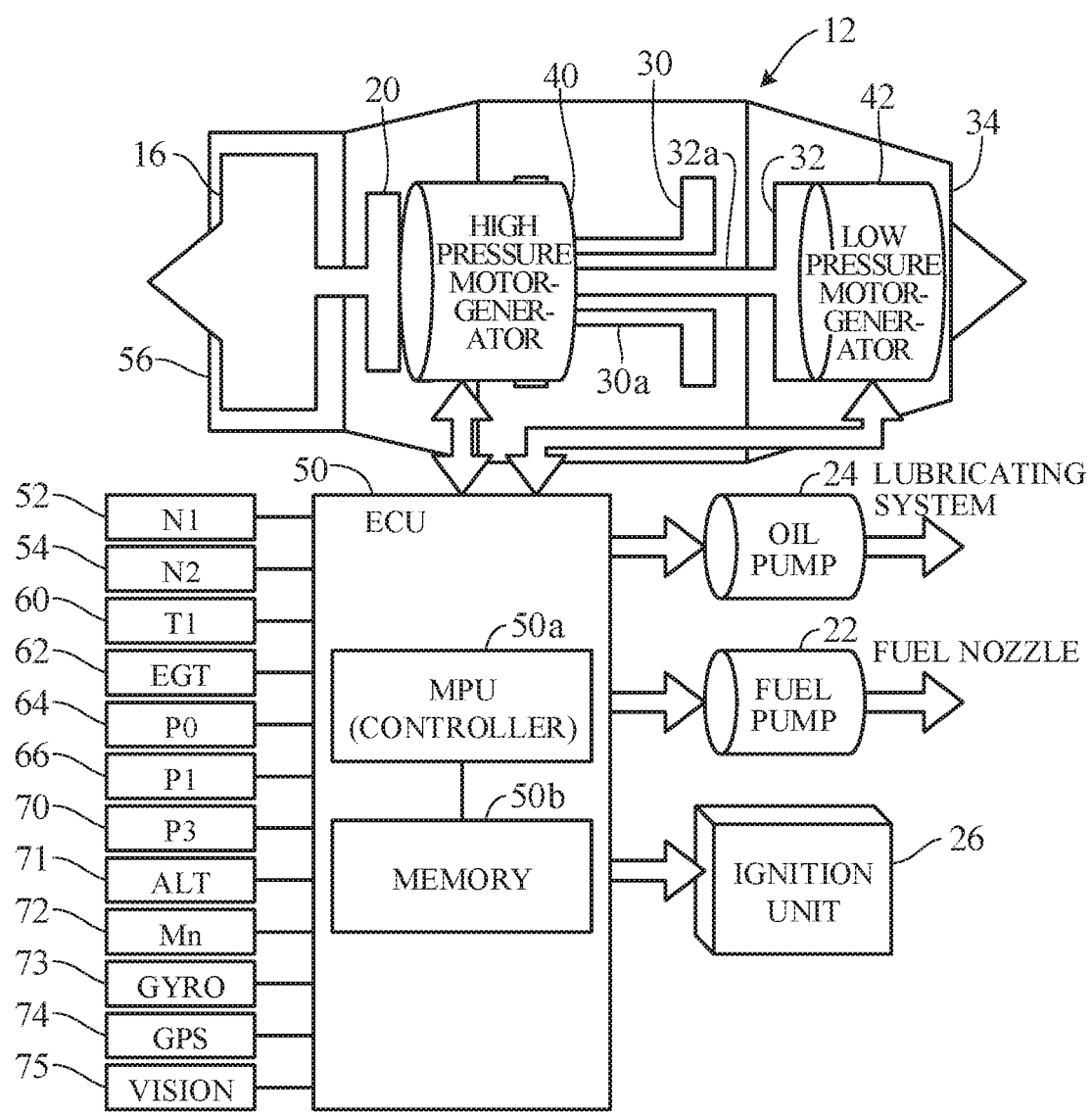
FIG. 2 is a schematic side view of the gas-turbine engine of FIG. 1.

FIG. 1 is a schematic diagram showing an overview of a vertical takeoff and landing aircraft in accordance with an embodiment of this invention, which comprises a gas-turbine engine and motor-generators. FIG. 2 is a schematic side view of the gas-turbine engine of FIG. 1, and FIG. 3 is an explanatory diagram showing energy transmission between the gas-turbine engine and the motor-generators during takeoff and landing of the vertical takeoff and landing aircraft of FIG. 1.

Figure 3:
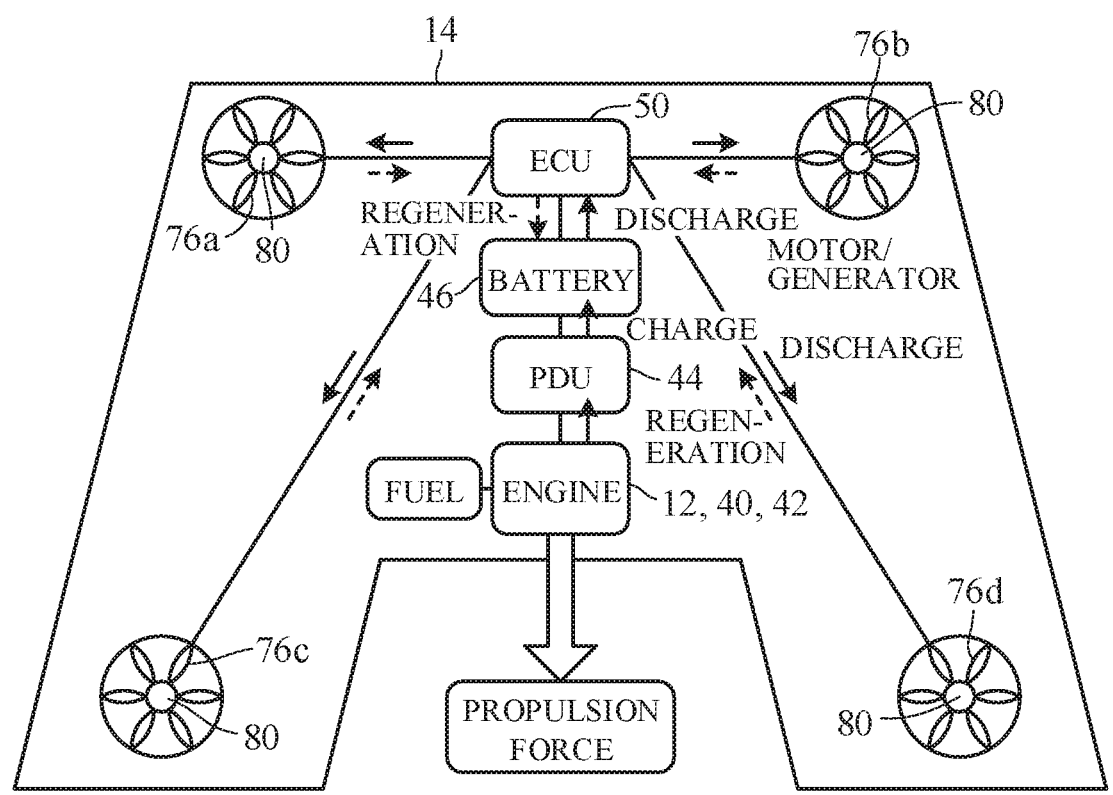
FIG. 3 is an explanatory diagram showing energy transmission between the gas-turbine engine and the motor-generators during takeoff and landing of the vertical takeoff and landing aircraft of FIG. 1.

In FIGS. 1 to 3, symbol 10 designates a vertical takeoff and landing aircraft (hereinafter "VTOL"). The VTOL 10 is configured as an unmanned aerial vehicle capable of taking off and landing vertically (straight upward and downward). The VTOL 10 is equipped with a gas-turbine engine 12 (hereinafter sometimes called simply "engine 12") as a main propulsion unit.

Four types of gas-turbine engines are known: turbojet, turbofan, turboprop and turboshaft. A two-shaft turbofan engine is taken as an example in the following explanation.

As shown in FIG. 1, the VTOL 10 comprises a frame 14 formed as a roughly trapezoidal fixed wing as viewed from above, and the engine 12 is installed as a single unit extending full length along a longitudinal (horizontal) axis 14a so as to traverse the middle of the frame 14 longitudinally.

The engine 12 comprises fan blades 16 that suck in external air during high-speed rotation. A rotor (not shown) is formed integrally with the fan blades 16a. The rotor and a stator (not shown) installed opposite the rotor together configure a low-pressure compressor 20 that compresses sucked in air and blows the compressed air rearward.

A duct (not shown) is formed in the vicinity of the fan blades 16 by a separator (not shown), so that most of the sucked-in air is jetted through this duct to rearward of the engine without participating in combustion at a later stage (core side). The fan exhaust produces a reaction force that acts as a propulsive force (thrust) on the frame 14 carrying the engine 12. Most propulsion is produced by this fan exhaust.

Air compressed by the low-pressure compressor 20 is sent to a later stage high-pressure compressor (not shown), where it is compressed by a rotor and stator and then sent to a later stage combustion unit. Fuel controlled by an FCU (Fuel Control Unit; not shown) is fed under pressure into the combustion unit through a fuel nozzle.

Specifically, the FCU is equipped with a fuel control valve (not shown) and fuel pumped by a fuel pump 22 from a fuel tank installed at a suitable location on the frame is metered by the fuel control valve and supplied to, and sprayed from, a fuel nozzle. Moreover, an oil pump 24 provided along with the fuel pump 22 supplies oil to a lubricating system.

Fuel sprayed from the fuel nozzle is mixed in the combustion unit with compressed air pressure-fed from the high-pressure compressor and then combusted after being ignited at engine starting by an ignition unit 26 comprising an exciter and a spark plug.

High-temperature, high-pressure gas generated by the combustion is jetted into a high-pressure turbine 30, thereby rotating the high-pressure turbine 30 at high speed. The high-pressure turbine 30 is connected to, and rotates the rotor of, the aforesaid high-pressure compressor through a high-pressure turbine shaft 30a.

After driving rotation of the high-pressure turbine 30, the high-temperature, high-pressure gas is sent to the low-pressure turbine 32 to rotate the low-pressure turbine 32 at relatively low speed. The low-pressure turbine 32 is connected through a low-pressure turbine shaft 32a (of coaxial dual shaft structure with the high-pressure turbine shaft 30a) to a rotor of the aforesaid low-pressure compressor 20 and rotates the rotor and fan. Gas exiting the high-pressure turbine 30 is of lower pressure than gas jetted from the combustion unit.

Exhaust gas exiting the low-pressure turbine 32 (turbine gas) is passed through a duct, mixed with directly exhausted fan exhaust and jetted rearward of the engine from a jet nozzle 34.

A high-pressure side motor-generator 40 and a low-pressure side motor generator 42 are attached, in each case coaxially, to the high-pressure turbine shaft 30a and low-pressure turbine shaft 32a of the engine 12. The high-pressure side motor-generator 40 functions as a starter-generator, and when the high-pressure turbine shaft 30a is rotated by the high-pressure side motor-generator 40 at starting of the engine 12, compressed air is generated and pressure-fed to the aforesaid combustion unit.

The high-pressure side motor-generator 40 and the low-pressure side motor generator 42 are each configured as a brushless DC motor comprising on its fixed side an outer rotor wound with a coil and inward of the outer rotor a stator having permanent magnets on its outer periphery. The high-pressure side and low-pressure side motor-generators 40 and 42 operate as motors when supplied with power and as generators when rotated by external force.

A PDU (Power Drive Unit) 44 (shown in FIG. 3) is connected to the high-pressure side and low-pressure side motor-generators 40 and 42. The PDU 44 is equipped with a converter and an inverter. The converter converts AC generated by the high-pressure side and low-pressure side motor generators 40 and 42 to DC for storage in a battery 46 (shown in FIG. 3), while the inverter inverts the stored DC power to the AC power if desired.

On the other hand, the fuel pump 22 is driven by rotation transmitted from the high-pressure turbine shaft 30a, so that as stated earlier metered fuel is supplied to the fuel nozzle to be mixed with compressed air and atomized. The resulting air-fuel mixture is ignited to initiate combustion.

Thus the engine 12 installed along the axis 14a in the longitudinal direction of the frame 14 comprises the high-pressure turbine shaft 30a and low-pressure turbine shaft 32a rotated by high-pressure gas jetted upon combustion of the air-fuel mixture, whereby a jetted stream of high-heat exhaust gas is obtained that produces propulsion force in the longitudinal direction of the frame 14.

An ECU (Electronic Control Unit (controller)) 50 is accommodated in a container and installed near the engine 12. The ECU 50 includes a microcomputer comprising, inter alia, a MPU (microprocessor) 50a, ROM, RAM and other memory 50b, and is installed at an engine upper end location as accommodated in the container.

An N1 sensor (rotational speed sensor) 52 installed in the engine 1 near the low-pressure turbine shaft 32a outputs a signal indicating low-pressure turbine rotational speed (low-pressure turbine shaft 32a rotational speed) N1, and an N2 sensor (rotational speed sensor) 54 installed in the engine 1 near the high-pressure turbine shaft 30a outputs a signal indicating high-pressure turbine rotational speed (high-pressure turbine shaft 30a rotational speed) N2.

Further, a T1 sensor (temperature sensor) 60 installed near an air intake 56 at the front of the frame 14 outputs a signal indicating engine inlet temperature (external air temperature or inflow air temperature) T1, and an EGT (Exhaust Gas Temperature) sensor 62 installed at an appropriate place downstream of the low-pressure turbine 32 outputs a signal indicating exhaust gas temperature (low-pressure turbine outlet temperature) EGT.

Moreover, a P0 sensor (pressure sensor) 64 installed inside the container accommodating the ECU 50 outputs a signal indicating atmospheric temperature P0, and a P1 sensor (pressure sensor) 66 installed near the air intake 56 outputs a signal indicating engine intake pressure (air intake port pressure) P1. In addition, a P3 sensor 70 installed downstream of the high-pressure compressor outputs a signal indicating compressor outlet pressure (high-pressure compressor outlet pressure) P3.

Further, the frame 14 has mounted thereon an altimeter (ALT) 71 that produces an output indicating altitude ALT at the position of the VTOL 10, and a craft speed meter (Mn) 72 that produces an output indicating aircraft speed Mn (Mach Number).

Further, the frame 14 has mounted at suitable locations thereon a gyrosensor 73 that produces an output indicating angle of inclination of the frame 14 relative to gravity axis, and a GPS receiver 74 that uses signals received from a group of satellites to produce an output indicating position of the frame 14. In addition, a single vision sensor 75 attached under the frame 14 to face downward outputs forward-looking captured images. Outputs of the aforesaid group of sensors are sent to the ECU 50.

As shown in FIGS. 1 and 3, the VTOL 10 is equipped with multiple, specifically four, fans 76 installed to be rotatable around axes parallel to a vertical axis 14b (which crosses with the longitudinal (horizontal) axis 14a) of the frame 14, and with four fan-side motor-generators (sub propulsion units) 80 (not shown in FIG. 1) that are individually connected to the four fans 76 and rotate the four fans 76 to generate lift (vertical force) on the frame 14.

The four fans 76 are structured as propellers or rotors individually accommodated inside air ducts 761 formed at four corners of the roughly trapezoidal frame 14 as viewed from above. As shown in FIG. 3, the four fans 76 are individually connected to their associated fan-side motor-generators 80 and driven by the fan-side motor-generators 80 to generate lift.

As viewed from above the frame 14, the four fans 76 are divided into two sets whose respective members are located at diagonally opposite positions, namely one set comprising the fans 76a and 76d that are, for example, rotated clockwise (CW) and another set comprising the fans 76b and 76c that are rotated counterclockwise (CCW), thereby achieving a configuration that can stably maintain posture (attitude) of the vertical takeoff and landing aircraft 10 by increasing and decreasing the rotations.

Lift, i.e., vertical direction (takeoff and landing direction) force, is increased by equalizing rotational speed of all four fans 76, and downward (landing direction) lift force (correctly termed "negative lift force") is achieved by uniformly decreasing the rotational speed of all four fans 76.

The ECU 50 is configured to function as a controller that controls operations of the engine (main propulsion unit) 12, high-pressure side motor-generator 40, low-pressure side motor generator 42 and fan-side motor-generators (sub propulsion units) 80 (more exactly so that the MPU 50a of the ECU 50 controls operation of the engine 12 and the like in accordance with a program stored in memory 50b).

Figure 4:
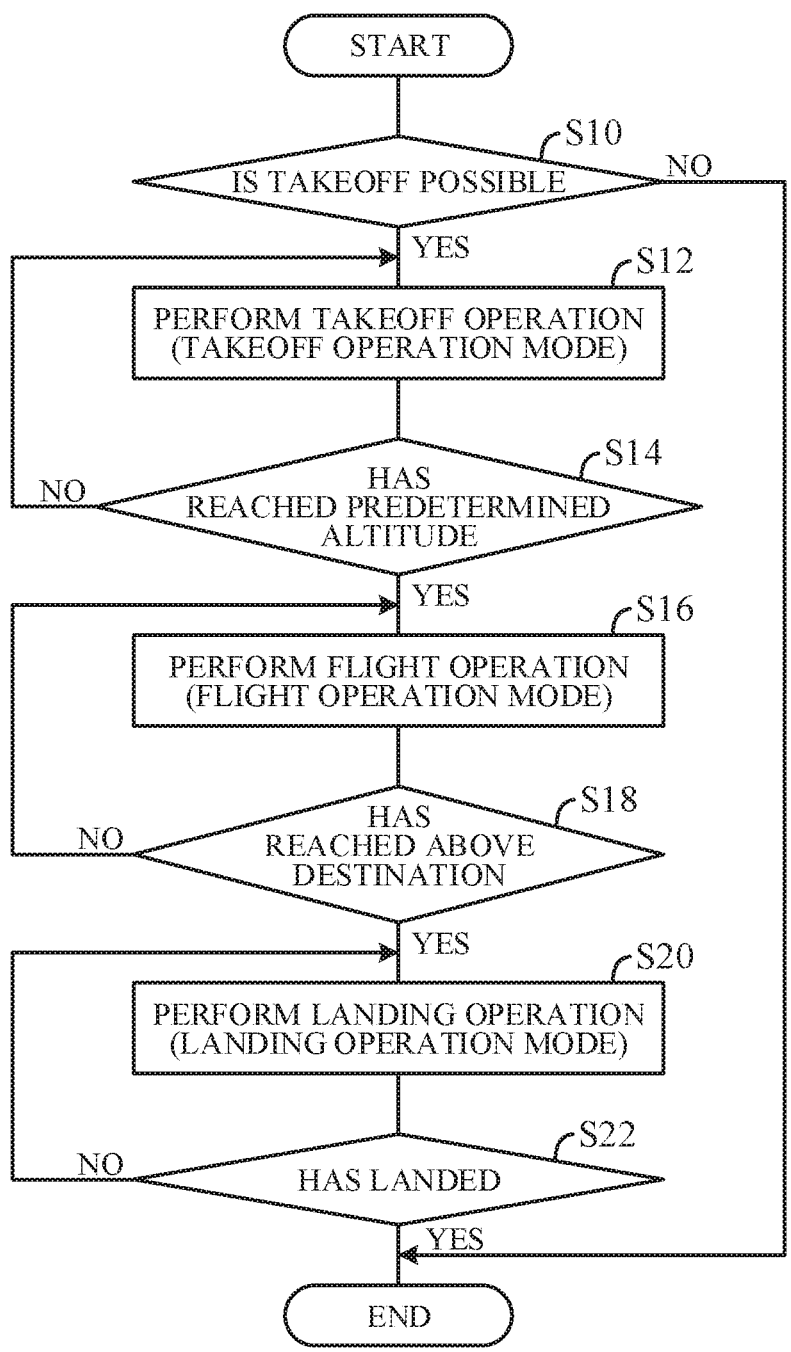
FIG. 4 is a flowchart showing operations of the vertical takeoff and landing aircraft of FIG. 1.

FIG. 4 is a flowchart showing said operations of the ECU 50.

Turning to an explanation of the flowchart, it is determined whether takeoff is possible in S10 (S: processing Step), and when the result is NO the ensuing processing is skipped, and when YES, the program goes to S12, in which takeoff operation is performed.

The program next goes to S14, in which it is determined whether a predetermined altitude has been reached based on the output of the altimeter 72, and when the result is NO, the program returns to S12, and when YES, goes to S16, in which flight (horizontal flight) operation is performed. In other words, the engine 12 is operated to fly toward an input destination while finely adjusting posture of the frame 14 based on output of the gyrosensor 73.

Next, the program next goes to S18, in which it is determined whether a point above the destination has been reached from the outputs of the GPS receiver 74 and the vision sensor 75, and when the result is NO, the program returns to S16, and when YES, goes to S20, in which landing operation is performed, i.e., operating mode is shifted to landing operation and touchdown operation. The landing operation is continued until the landing is confirmed at S22.

FIG. 5 is an explanatory diagram showing operation of the VTOL 10.

Turning to an explanation with reference to FIG. 5, in the case of the operation sequence of the frame 14 to obtain horizontal propulsion force (S16 in FIG. 4), the ECU 50 implements an operating mode of the engine 12 in a propulsion mode that adjusts fuel supply in accordance with flight condition, supplies regenerative electric power obtained from one or the other of the high-pressure side motor-generator 40 and the low-pressure side motor generator 42, particularly from the high-pressure side motor-generator 40, to the low-pressure side motor generator 42 to operate it as a motor and thereby assist rotation of the high-pressure turbine shaft 30a and low-pressure turbine shaft 32a, particularly of the high-pressure turbine shaft 30a, of the engine 12.

Further, in order to obtain propulsion force in vertical direction (takeoff/ascending direction and descension/landing direction) of the frame 14 (S12 and S20 in FIG. 4), control is performed to implement operating mode of the engine 12 in a charging mode operating as a generator, thereby reducing rotation of the high-pressure turbine shaft 30a and low-pressure turbine shaft 32a to predetermined amounts, and to operate the fan-side motor-generators 80 to generate lift force in the vertical direction of the frame 14.

Specifically, when propulsion force in the vertical direction of the frame 14 is to be obtained, the ECU 50 implements control to supply regenerative electric power obtained by driving one or the other of the high-pressure side motor-generator 40 and the low-pressure side motor generator 42 to the fan-side motor-generators 80, thereby increasing lift acting on the frame.

As shown in FIG. 3, regenerative electric power not consumed by the fan-side motor-generators 80 (or the high-pressure side and low-pressure side motor generators 40 and 42) is charged (stored) in the battery 46 and discharged from the battery 46 to the fan-side motor-generators 80 and the like as necessary.

More specifically, in order to obtain vertical propulsion force on the frame 14, the ECU 50 performs control to drive the low-pressure side motor generator 42 with rotation of the low-pressure turbine shaft 32a and supplies the regenerative electric power obtained to the fan-side motor-generators 80, thereby increasing lift acting on the frame 14.

At this time, when obtaining vertical propulsion force on the frame 14 in a case where the vertical direction of the frame 14 is descension, i.e., landing direction, the ECU 50 performs control to reduce power obtained by driving the low-pressure side motor generator 42 with rotation of the low-pressure turbine shaft 32a to less than that in the case where the vertical direction of the frame 14 is takeoff direction, i.e., ascension, whereby output of the fan-side motor-generators 80 changes from large output to small output.

In order to stop the VTOL 10 in midair (hovering), power obtained by driving the low-pressure side motor generator 42 with rotation of the low-pressure turbine shaft 32a is reduced to midlevel so as to control output of the fan-side motor-generators 80 to midlevel output.

Further, when the VTOL 10 is on the ground, the ECU 50 stops operation of the fan-side motor-generators 80 and supplies power obtained from the low-pressure side motor generator 42 to the high-pressure side motor-generator 40 to operate it as a motor and assist rotation of the high-pressure turbine shaft 30a and low-pressure turbine shaft 32a, particularly the high-pressure turbine shaft 30a, of the engine 12.

As set forth in the foregoing, the embodiment is configured to have a vertical takeoff and landing aircraft (VTOL), comprising: a main propulsion unit (gas-turbine engine) 12 having a high-pressure turbine shaft 30a and a low-pressure turbine shaft 32a installed along a longitudinal axis 14a of a frame 14 and rotated by pressurized gas jetted upon combustion of an air-fuel mixture, the main propulsion unit 12 being driven by obtained jetted stream of high-heat exhaust gas to produce propulsion force in a longitudinal direction of the frame 14; a high-pressure side motor-generator 40 and a low-pressure side motor generator 42 coaxially attached to the high-pressure turbine shaft 30a and the low-pressure turbine shaft 32a in the frame 14; multiple fans 76 installed on the frame 14 to be rotatable around axes parallel to a vertical axis 14b of the frame 14; sub propulsion units (fan-side motor-generators) 80 individually connected to the multiple fans 76 to rotate the multiple fans 76 and generate lift force in a vertical direction of the frame 14; and a controller (the MPU 50a of the ECU 50) configured to control operation of the main propulsion unit 12, the high-pressure side motor-generator 40, the low-pressure side motor generator 42 and the sub propulsion units 80; wherein the controller controls to; when obtaining propulsion force in the longitudinal direction of the frame 14 (S16 in FIG. 4), supply electric power obtained by driving the high-pressure side motor-generator 40 by rotation of the high-pressure turbine shaft 30a to the low-pressure side motor generator 42 to operate the low-pressure side motor generator 42 as a motor so as to assist rotation of the low-pressure turbine shaft 32a of the main propulsion unit 12; and when obtaining propulsion force in the vertical direction of the frame 14 (S12 and S20 in FIG. 4), reduce rotations of the high-pressure turbine shaft 30a and low-pressure turbine shaft 32a of the main propulsion unit 12 to predetermined amounts and operate the sub propulsion units 80 to generate lift force in the vertical direction of the frame 14, and supply electric power obtained by driving at least one of the high-pressure side motor-generator 40 and the low-pressure side motor generator 42 to the sub propulsion units 80 to increase the lift force in the vertical direction of the frame 14, which configuration enables provision of a VTOL with enhanced fuel efficiency performance.

In other words, since increasing rotation of the low-pressure turbine shaft 32a is effective for obtaining horizontal propulsion, it is advantageous for increasing horizontal propulsion to supply electric power obtained from the high-pressure side motor-generator 40, for example, to the low-pressure side motor generator 42 so as to assist and increase rotation of the low-pressure turbine shaft 32a.

On the other hand, it is preferable for obtaining vertical propulsion (lift) to increase supply of electric power to the fan-side motor-generators 80 that drive the fans 76, while simultaneously suppressing horizontal propulsion as much practical. So, since lift on the frame 14 can be produced by reducing rotation of the high-pressure turbine shaft 30a and low-pressure turbine shaft 32a of the engine (main propulsion unit) 12 to a certain level and also operating the fan-side motor-generators (sub propulsion units) 80, it is possible to increase lift on the frame and thus enhance fuel efficiency performance by, for example, driving one of the high-pressure side motor-generator 40 and low-pressure side motor generator 42 and supplying so-generated electric power to the sub propulsion units.

When the high-pressure turbine side is under high load, rotation of the high-pressure turbine shaft 30a and rotation of the low-pressure turbine shaft 32a decrease, which upsets balance with airflow supplied from the low-pressure compressor, but by simultaneously increasing load on the low-pressure turbine side, rotation of the low-pressure turbine shaft 32a can also be reduced. In addition, by reducing the rotational speed of the high-pressure turbine shaft 30a, unnecessary horizontal propulsion can be minimized.

As a configuration is thus adopted whereby the engine (main propulsion unit) 12 generates propulsion and electric power in accordance with horizontal propulsion and lift, electric power generated by the engine 12 can be relied on when high power is necessary for generating lift, so that a battery of relatively small capacity suffices as the battery 46.

Moreover, in the VTOL 10, the controller controls to supply electric power obtained by driving the low-pressure side motor generator 42 by rotation of the low-pressure turbine shaft 32a to the sub propulsion units 80 to increase lift force in the vertical direction of the frame, when obtaining propulsion force in the vertical direction of the frame 14, so that the aforesaid effects can be still more positively realized.

Further, in the VTOL 10, the controller controls to reduce, in a case where the direction of the propulsion force is in a frame descending direction, the power obtained by driving the low-pressure side motor generator 42 by rotation of the low-pressure turbine shaft 32 to less than that in a case where the direction of the propulsion force is a frame ascending direction, when obtaining propulsion force in the vertical direction of the frame 14. With this, in addition to the aforesaid effects and advantages, no unnecessary extraction of high electric power from the engine 12 occurs.

In the VTOL 10, the high-pressure side motor generator 40 and low-pressure side motor generator 42 are connected to a battery 46 through a power drive unit 44 equipped with a converter, and the controller controls to operate the converter to convert AC generated by the high-pressure side motor generator 40 and the low-pressure side motor generator 42 to DC to be stored in the battery 46. With this, in addition to the effects and advantages, fuel efficiency performance can be further improved since the electric power not consumed can be stored in the battery 46 and discharged therefrom as desired.

In the VTOL 10, the frame 14 is formed as a roughly trapezoidal fixed wing as viewed from above, and the main propulsion unit 12 is installed as a single unit extending along the longitudinal axis 14a so as to traverse the middle of the frame 14 longitudinally. With this, in addition to the effects and advantages, the structure of the VTOL 10 can be made compact so that fuel efficiency performance can be further improved.

In the VTOL 10, the sub propulsion units comprises multiple motor-generators 80 individually connected to the multiple fans 76. With this, in addition to the effects and advantages, the structure of the VTOL 10 can be made compact so that fuel efficiency performance can be further improved.

The number of the fans 76 is not limited to four as in the foregoing description but can be any number defined by 2n, where n≥2.

Although a turbofan engine was cited as an example of the engine 12 in the foregoing, the engine 12 can instead be a turboprop engine. In such case, frame direction propulsion is obtained by driving a propeller with a high-pressure exhaust jet stream.

While the present invention has been described with reference to the preferred embodiments thereof, it will be understood, by those skilled in the art, that various changes and modifications may be made thereto without departing from the scope of the appended claims.

What is claimed is:
1. A vertical take-off and landing aircraft, comprising:
a main propulsion unit having a high-pressure turbine shaft and a low-pressure turbine shaft installed along a longitudinal axis of a frame and rotated by pressurized gas jetted upon combustion of an air-fuel mixture, the main propulsion unit being driven by obtained jetted stream of high-heat exhaust gas to produce propulsion force in a longitudinal direction of the frame;

a high-pressure side motor-generator and a low-pressure side motor generator coaxially attached to the high-pressure turbine shaft and the low-pressure turbine shaft in the frame;

multiple fans installed on the frame to be rotatable around axes parallel to a vertical axis of the frame;

sub propulsion units individually connected to the multiple fans to rotate the multiple fans and generate lift force in a vertical direction of the frame; and a controller configured to control operation of the main propulsion unit, the high-pressure side motor-generator, the low-pressure side motor generator and the sub propulsion units;

wherein the controller controls to;

when obtaining propulsion force in the longitudinal direction of the frame, supply electric power obtained by driving the high-pressure side motor-generator by rotation of the high-pressure turbine shaft to the low-pressure side motor generator to operate the low-pressure side motor generator as a motor so as to assist rotation of the low-pressure turbine shaft of the main propulsion unit; and when obtaining propulsion force in the vertical direction of the frame, reduce rotations of the high-pressure turbine shaft and low-pressure turbine shaft of the main propulsion unit to predetermined amounts and operate the sub propulsion units to generate lift force in the vertical direction of the frame, and supply electric power obtained by driving at least one of the high-pressure side motor-generator and the low-pressure side motor generator to the sub propulsion units to increase the lift force in the vertical direction of the frame.

2. The aircraft according to claim 1, wherein the controller controls to supply electric power obtained by driving the low-pressure side motor generator by rotation of the low-pressure turbine shaft to the sub propulsion units to increase lift force in the vertical direction of the frame, when obtaining propulsion force in the vertical direction of the frame.

3. The aircraft according to claim 1, wherein the controller controls to reduce, in a case where the direction of the propulsion force is in a frame descending direction, the power obtained by driving the low-pressure side motor generator by rotation of the low-pressure turbine shaft to less than that in a case where the direction of the propulsion force is a frame ascending direction, when obtaining propulsion force in the vertical direction of the frame.

4. The aircraft according to claim 1, wherein the high-pressure side motor generator and low-pressure side motor generator are connected to a battery through a power drive unit equipped with a converter, and the controller controls to operate the converter to convert AC generated by the high-pressure side motor generator and the low-pressure side motor generator to DC to be stored in the battery.

5. The aircraft according to claim 1, wherein the frame is formed as a roughly trapezoidal fixed wing as viewed from above, and the main propulsion unit is installed as a single unit extending along the longitudinal axis so as to traverse the middle of the frame longitudinally.

6. The aircraft according to claim 1, wherein the sub propulsion units comprises multiple motor-generators individually connected to the multiple fans.

* * * * *